(12) United States Patent
Azores (10) Patent No.: US 12,344,136 B2
(45) Date of Patent: Jul. 1, 2025

(54) CAR SEAT ABANDONMENT PREVENTION SYSTEM (71) Applicant: James Azores, Modesto, CA (US)

(72) Inventor: James Azores, Modesto, CA (US)

(*) Notice: Subject to any disclaimer, the term of this patent is extended or adjusted under 35 U.S.C. 154(b) by 108 days.

(21) Appl. No.: 18/133,149

(22) Filed: Apr. 11, 2023

(65) Prior Publication Data

US 2024/0343163 A1 Oct. 17, 2024

(51) Int. Cl.
*G08B 21/24* (2006.01)
*B60N 2/26* (2006.01)
*B60N 2/28* (2006.01)

(52) U.S. Cl.
CPC ............ *B60N 2/267* (2023.08); *B60N 2/274* (2023.08); *B60N 2/2821* (2013.01); *B60Y 2400/301* (2013.01); *B60Y 2410/132* (2013.01)

(58) Field of Classification Search
CPC ....... B60N 2/002; B60N 2/267; B60N 2/2821
USPC .... 340/457, 457.1, 464, 488, 505, 567, 571, 340/665, 691.6
See application file for complete search history.

(56) References Cited

U.S. PATENT DOCUMENTS

| | | | |
|---|---|---|---|
| D383,912 S | 9/1997 | Meeker | |
| 7,012,533 B2 | 3/2006 | Younse | |
| 8,950,809 B2 * | 2/2015 | Szakelyhidi | B60N 2/273 297/256.16 |
| 10,068,452 B1 | 9/2018 | Nunez | |
| 10,127,794 B1 | 11/2018 | Britt | |
| 10,163,316 B2 | 12/2018 | Roisen | |
| 10,214,118 B1 * | 2/2019 | Jain | B60K 35/60 |
| 10,276,016 B2 | 4/2019 | Mattarocci | |
| 2005/0057350 A1 * | 3/2005 | Younse | G08B 21/22 340/457.1 |
| 2011/0080288 A1 | 4/2011 | Younse | |
| 2016/0042616 A1 * | 2/2016 | Dorsey | G08B 21/22 340/457 |
| 2017/0001560 A1 * | 1/2017 | Roisen | G08B 21/0277 |
| 2017/0297485 A1 * | 10/2017 | Biesaga | G08B 21/0202 |
| 2017/0305340 A1 * | 10/2017 | Rose | G08B 21/22 |
| 2019/0251818 A1 * | 8/2019 | Nagatomi | B60N 2/267 |
| 2020/0298782 A1 * | 9/2020 | Zancanato | B60N 2/28 |
| 2022/0063536 A1 * | 3/2022 | Creek | B60R 21/01554 |
| 2022/0363168 A1 * | 11/2022 | Hasan | B60R 21/01556 |
| 2023/0179744 A1 * | 6/2023 | Avila | B60N 2/28 348/148 |
| 2023/0294561 A1 * | 9/2023 | Crenshaw | G08B 21/22 340/457 |

FOREIGN PATENT DOCUMENTS

EP 3312047 4/2018

* cited by examiner

*Primary Examiner* — Daniel Previl (57) ABSTRACT

A car seat abandonment prevention system for alarming a driver of the presence of a child within a vehicle by sending a signal to a mobile device includes a vehicle having a driver seat and a back seat. A car seat is removably attached to a base to define a safety seat. A door position sensor is mounted to the vehicle and is activated when a driver positions a driver door of the vehicle in a closed position or in an open position. A seat position sensor is mounted to the safety seat and is activated when the driver attaches the car seat to the base of the safety seat or removes the car seat from the base of the safety seat.

11 Claims, 6 Drawing Sheets

CAR SEAT ABANDONMENT PREVENTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to abandonment prevention systems and more particularly pertains to a new abandonment prevention system for alarming a driver of the presence of a child within a vehicle by sending a signal to a mobile device.

(2) Description of Related Art Including Information Disclosed Under 37 CFR 1.97 and 1.98

The prior art relates to abandonment prevention systems and includes a variety of systems being coupled to a car seat or to a vehicle. Known prior art does not include a system being coupled to a car seat and to a vehicle and notifies a driver of the vehicle of the presence of the car seat by sending a message to a mobile device of the driver.

BRIEF SUMMARY OF THE INVENTION

An embodiment of the disclosure meets the needs presented above by generally comprising a vehicle including a frame. A plurality of seats is positioned within the frame and the plurality of seats includes a driver seat and a back seat. A plurality of doors is coupled to the frame and the plurality of doors includes a driver door positioned proximate to the driver seat of the plurality of seats. A car seat is removably attached to a base to define a safety seat. A door position sensor is mounted to the vehicle and is actuated when a driver positions the driver door of the vehicle in a closed position or in an open position. The door position sensor comprises a door magnet and a vehicle reed switch. A transmitter is electrically coupled to the door position sensor and is actuated to send a closed signal when the vehicle reed switch detects the door magnet and the transmitter is actuated to send an open signal when the vehicle reed switch does not detect the door magnet. A power source is electrically coupled to the door position sensor. A seat position sensor is mounted to the safety seat and is actuated when the driver attaches the car seat to the base of the safety seat or removes the car seat from the base of the safety seat. The seat position sensor comprises a safety seat reed switch and a seat magnet. A transceiver is electrically coupled to the seat position sensor and is in wireless communication with the transmitter of the door position sensor. A control circuit is electrically coupled to the transceiver and is configured to send an alarm signal from the transceiver to a personal electronic device when the safety seat reed switch detects the seat magnet and the transceiver receives the open signal from the transmitter. A power supply is electrically coupled to the control circuit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
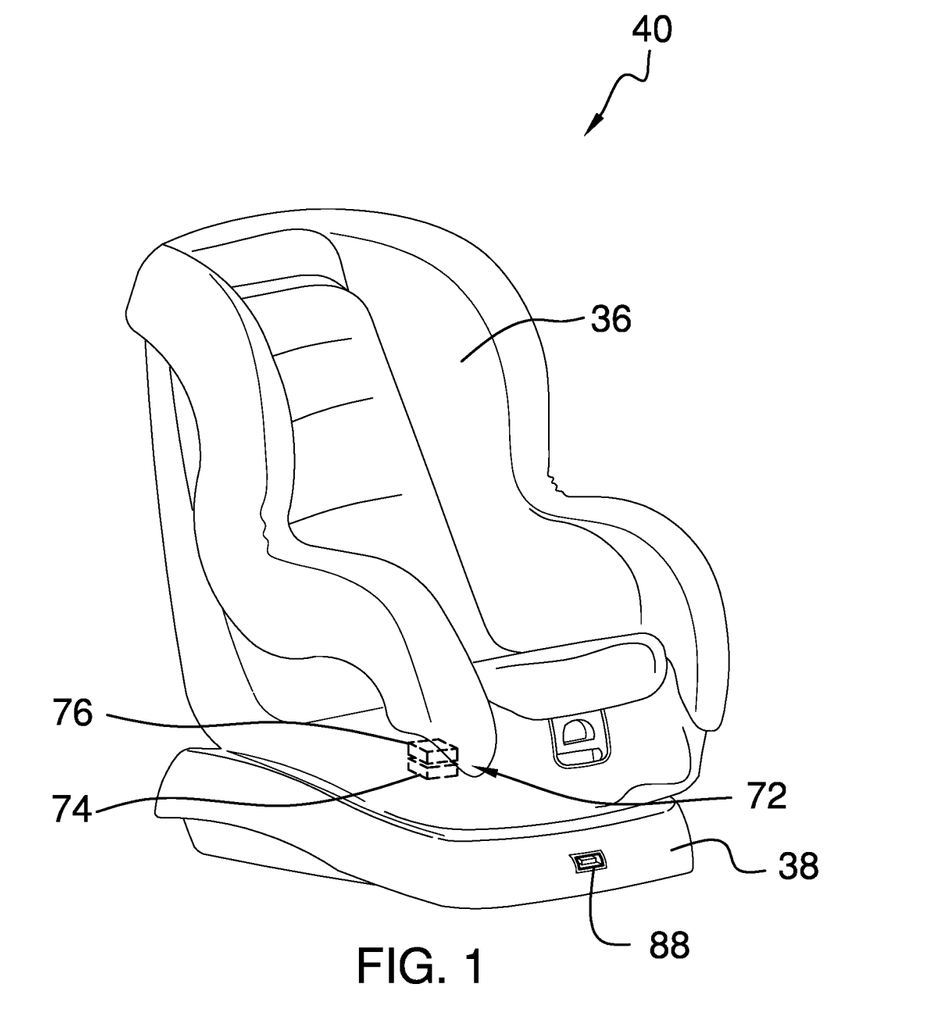
FIG. 1 is a front isometric view of a car seat abandonment prevention system according to an embodiment of the disclosure.
Figure 2:
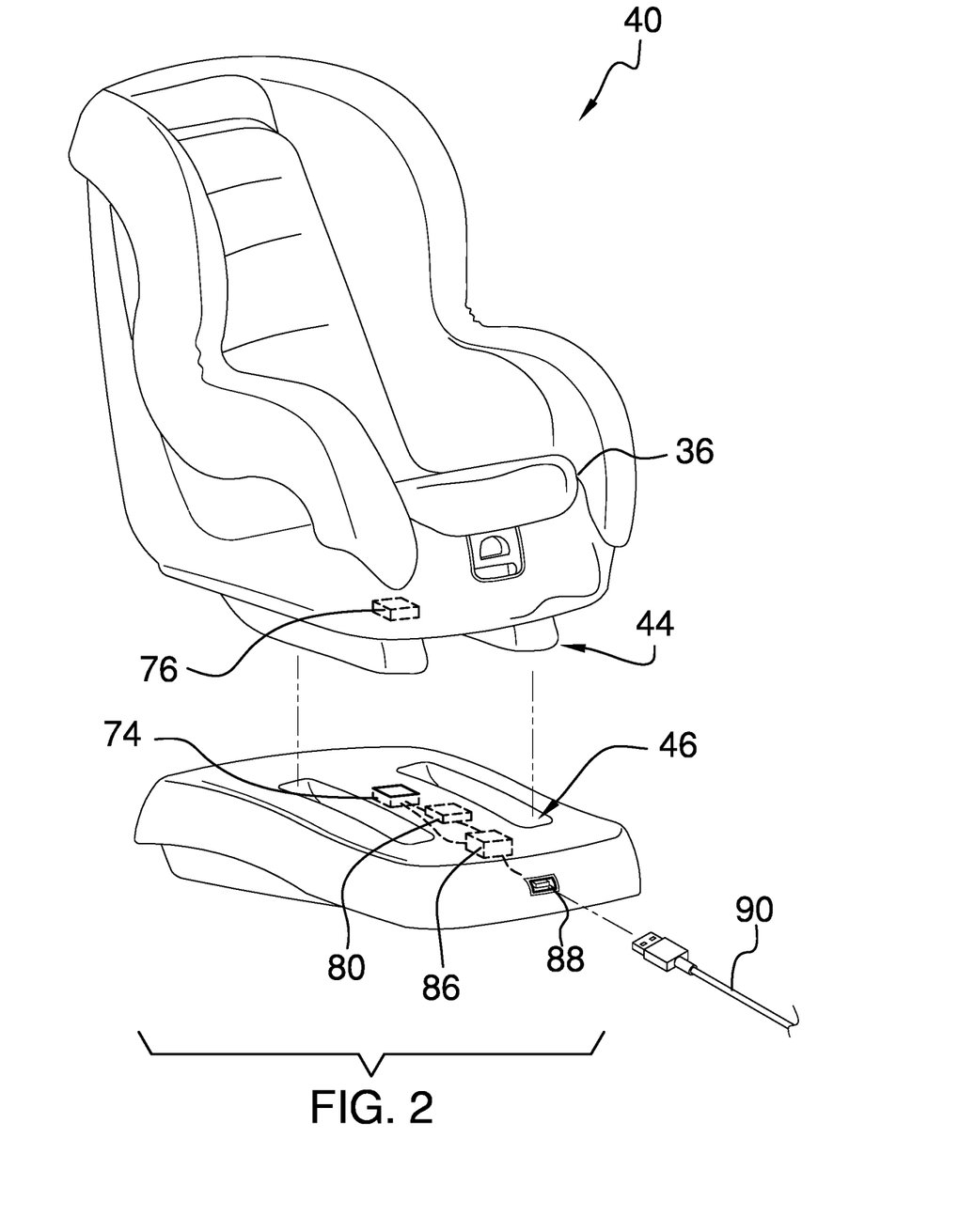
FIG. 2 is an exploded isometric view of an embodiment of the disclosure.
Figure 3:
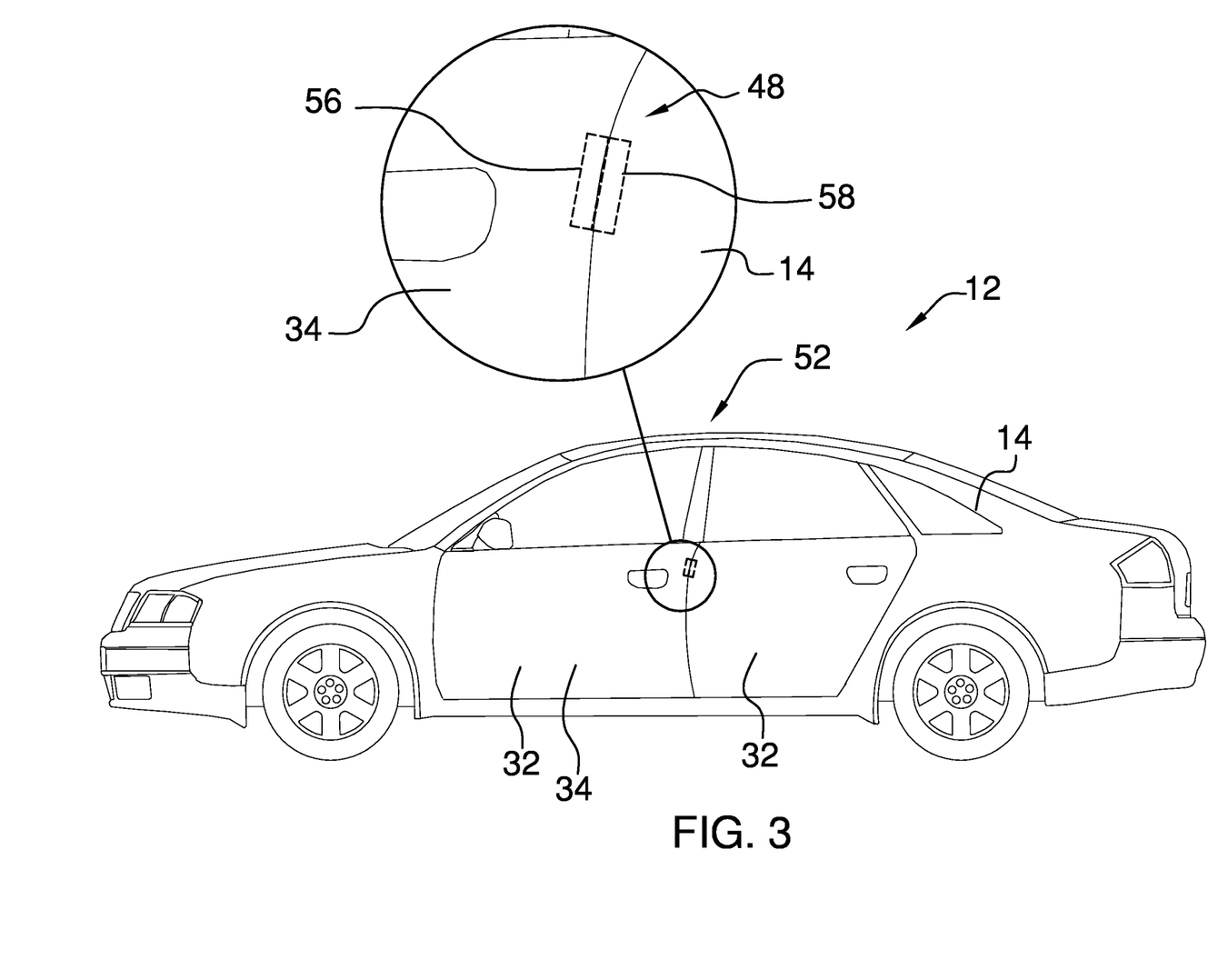
FIG. 3 is a side view of an embodiment of the disclosure.
Figure 4:
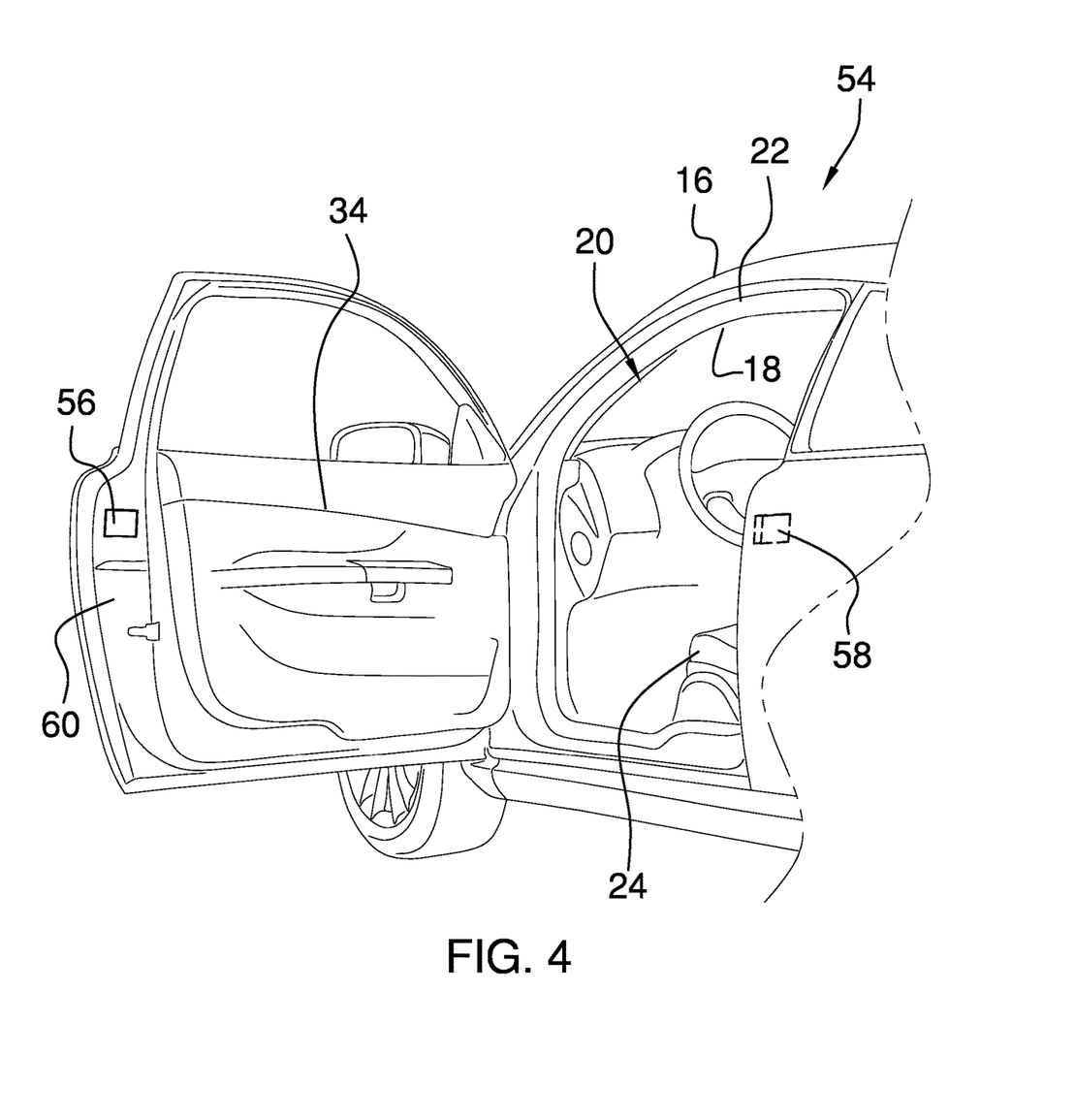
FIG. 4 is a detail view of an embodiment of the disclosure.
Figure 5:
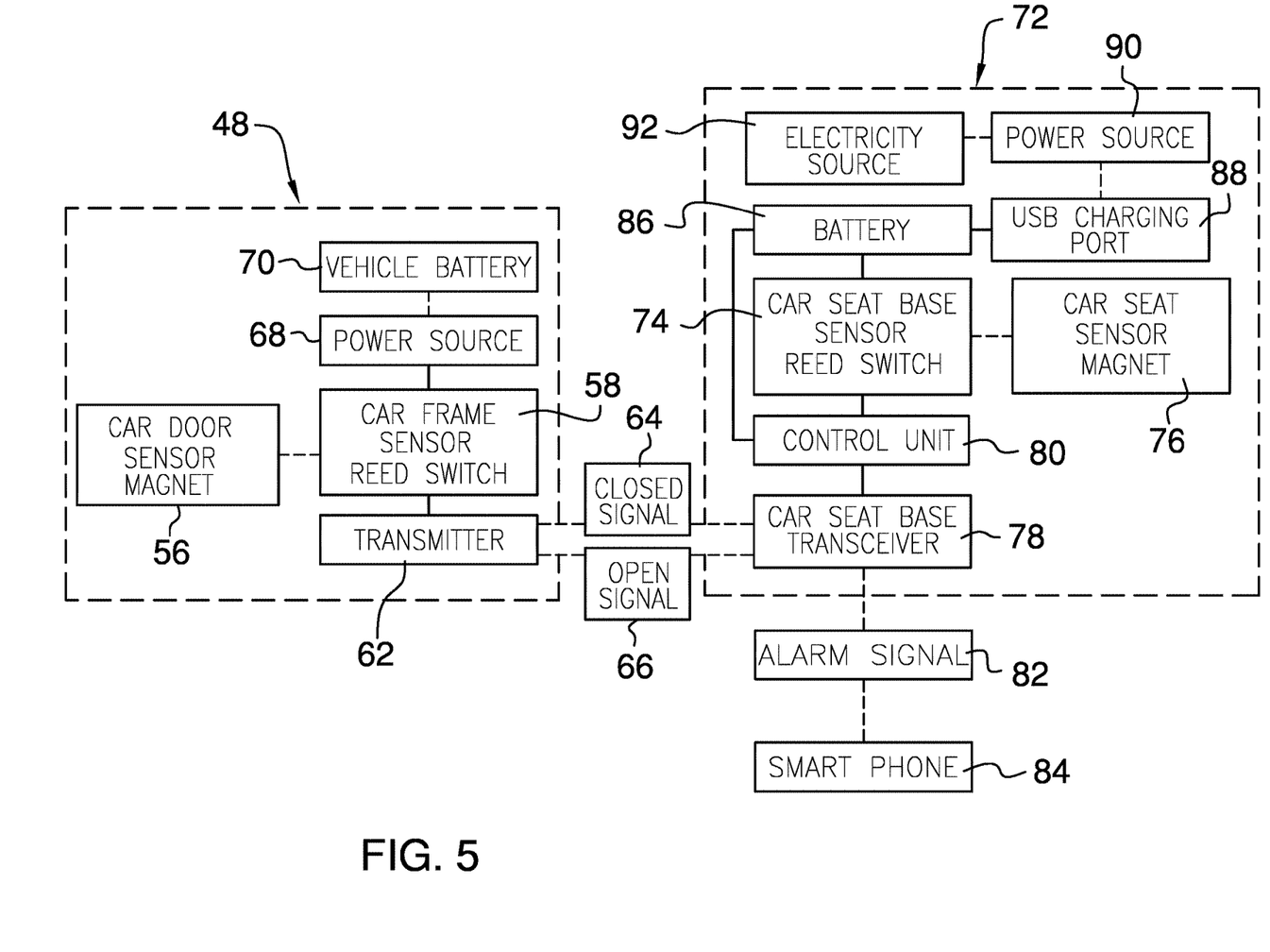
FIG. 5 is a block diagram view of an embodiment of the disclosure.
Figure 6:
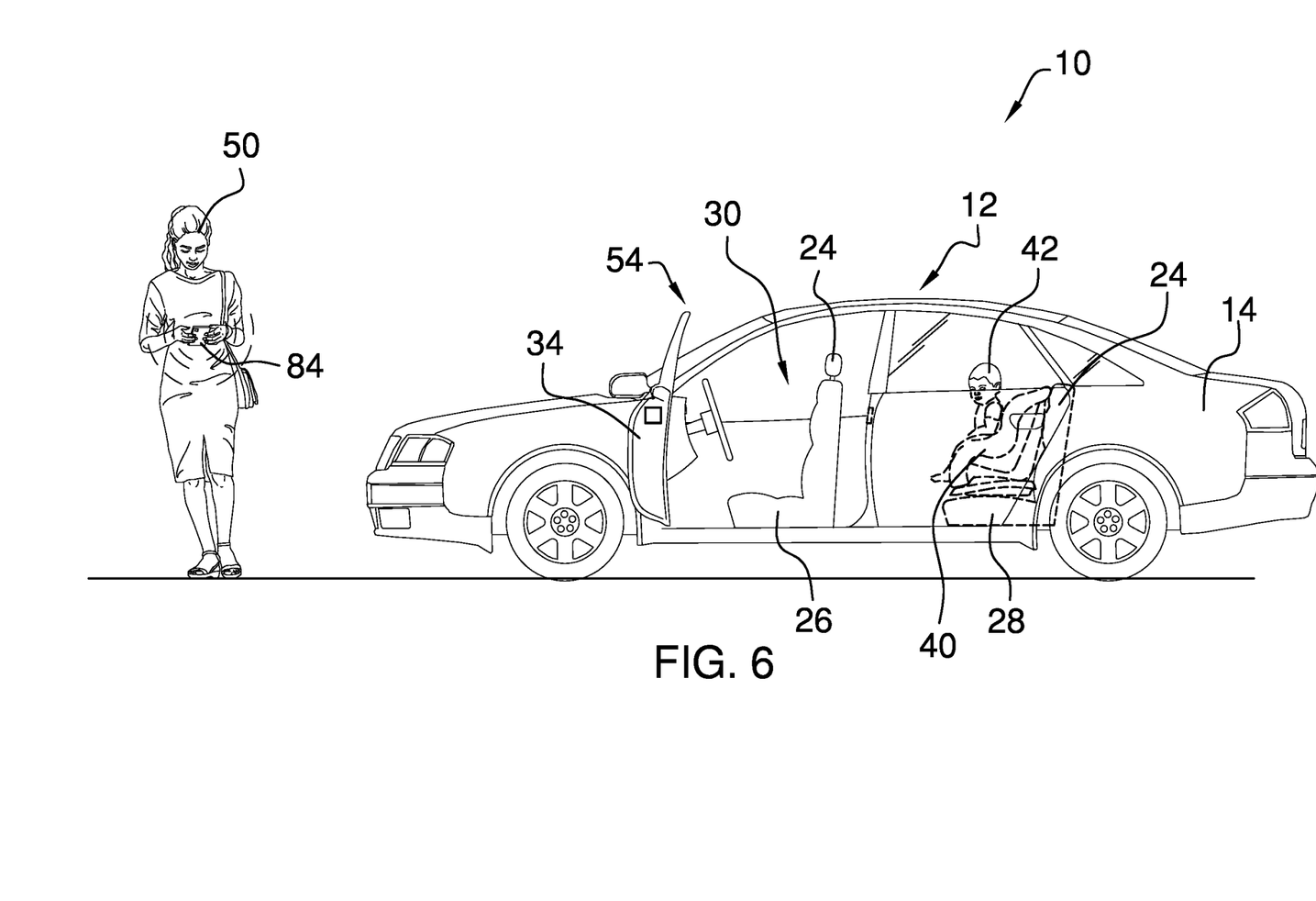
FIG. 6 is an in-use view of an embodiment of the disclosure.

With reference now to the drawings, and in particular to FIGS. 1 through 6 thereof, a new abandonment prevention system embodying the principles and concepts of an embodiment of the disclosure and generally designated by the reference numeral 10 will be described.

As best illustrated in FIGS. 1 through 6, the car seat abandonment prevention system 10 generally comprises a vehicle 12 including a frame 14. The frame 14 has an exterior surface 16 and an interior surface 18, and the frame 14 typically has a plurality of openings 20 extending through the exterior surface 16 and the interior surface 18. Each of the openings 20 forms a perimeter surface 22 between the exterior surface 16 and the interior surface 18 of the frame 14. A plurality of seats 24 is normally positioned within the frame 14 and normally includes a driver seat 26 and a back seat 28. One of the openings 20 is positioned proximate to the driver seat 26 to define a driver opening 30. A plurality of doors 32 is coupled to the frame 14 and the plurality of doors 32 typically includes a driver door 34 positioned proximate to the driver seat 26 of the plurality of seats 24. Each of the doors 32 is pivotally coupled to the perimeter surface 22 of one of the plurality of openings 20 of the frame 14, wherein the driver door 34 is pivotally coupled to the perimeter surface 22 of the driver opening 30.

A car seat 36 is removably attached to a base 38 to define a safety seat 40. The car seat 36 is configured for holding a child 42. Alternatively, the car seat 36 may be configured to hold an animal such as a dog or a cat. A bottom side of the car seat 36 normally has a first mating member 44, and a top side of the base 38 normally has a second mating member 46, wherein the first mating member 44 releasably couples to the second mating member 46. The safety seat 40 is typically removably fastened to the back seat 28 of the vehicle 12.

A door position sensor 48 is mounted to the vehicle 12 and is actuated when a driver 50 positions the driver door 34 of the vehicle 12 in a closed position 52 or in an open position 54. Each of the doors 32 allows access through a selective one of the plurality of openings 20 of the frame 14 in the open position 54 and each of the doors 32 inhibits access through the selective one of the plurality of openings 20 of the frame 14 in the closed position 52. The door position sensor 48 normally comprises a door magnet 56 and a vehicle reed switch 58. The door magnet 56 is normally mounted to the driver door 34 and may be mounted to a boundary surface 60 of the driver door 34. The vehicle reed switch 58 is normally mounted to the frame 14 of the vehicle 12 and may be mounted to the perimeter surface 22 of the driver opening 30 such that the boundary surface 60 of the driver door 34 is facing the perimeter surface 22 of the driver opening 30 in the closed position 52, wherein the door magnet 56 faces the vehicle reed switch 58 in the closed position 52. The vehicle reed switch 58 detects the door magnet 56 when the driver door 34 is positioned in the closed position 52 and the vehicle reed switch 58 does not detect the door magnet 56 when the driver door 34 is positioned in the open position 54.

A transmitter 62 is electrically coupled to the door position sensor 48. The transmitter 62 is normally electrically coupled to the vehicle reed switch 58 and is actuated to send a closed signal 64 when the vehicle reed switch 58 detects the door magnet 56. Additionally, the transmitter 62 is actuated to send an open signal 66 when the vehicle reed switch 58 does not detect the door magnet 56. A power source 68 is electrically coupled to the door position sensor 48 and is typically electrically coupled to the vehicle reed switch 58. The power source 68 is coupled to the vehicle 12 and may be configured to receive electricity from a vehicle battery 70 of the vehicle 12.

A seat position sensor 72 is mounted to the safety seat 40 and is actuated when the driver 50 attaches the car seat 36 to the base 38 of the safety seat 40 or removes the car seat 36 from the base 38 of the safety seat 40. The seat position sensor 72 normally comprises a safety seat reed switch 74 and a seat magnet 76. The safety seat reed switch 74 is typically mounted to the top side of the base 38 of the safety seat 40 and the seat magnet 76 is typically mounted to the bottom side of the car seat 36, wherein the seat magnet 76 is facing the safety seat reed switch 74 when the car seat 36 is attached to the base 38. The safety seat reed switch 74 detects the seat magnet 76 when the car seat 36 is attached to the base 38, and the safety seat reed switch 74 does not detect the seat magnet 76 when the car seat 36 is removed from the base 38.

A transceiver 78 is electrically coupled to the seat position sensor 72 and is in wireless communication with the transmitter 62 of the door position sensor 48. A control circuit 80 is electrically coupled to the transceiver 78 and is configured to send an alarm signal 82 from the transceiver 78 to a personal electronic device 84 when the safety seat reed switch 74 detects the seat magnet 76 and the transceiver 78 receives the open signal 66 from the transmitter 62, wherein the driver 50 is alerted via the alarm signal 82 of the personal electronic device 84 of the presence of the car seat 36 within the vehicle 12 so that the driver 50 does not forget the child 42 held within the car seat 36. A power supply 86 is electrically coupled to the control circuit 80 and is coupled to the base 38 of the safety seat 40. The power supply 86 is typically a rechargeable battery, and a power port 88 is mounted on the base 38 of the safety seat 40 and is electrically coupled to the power supply 86. The power port 88 may receive a power cord 90 from an electricity source 92 to recharge the power supply 86.

In use, the car seat 36 holding the child 42 is attached to the base 38 of the safety seat 40 positioned on the back seat 28 of the vehicle 12. The transmitter 62 sends the open signal 66 to the transceiver 78 when the driver 50 opens the driver door 34 into the open position 54 to enter or exit the vehicle 12, and the transceiver 78 sends the alarm signal 82 to personal electronic device 84 of the driver 50 thereafter.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A child abandonment prevention system configured for alerting a driver of a child in a safety seat, said child abandonment prevention system comprising:
   a vehicle, said vehicle including:
      a frame;
      a plurality of seats being positioned within said frame, said plurality of seats including a driver seat and a back seat; and
      a plurality of doors being coupled to said frame, said plurality of doors including a driver door being positioned proximate to said driver seat of said plurality of seats;
   a car seat being removably attached to a base to define the safety seat;

a door position sensor being mounted to the vehicle, said door position sensor being actuated when the driver positions the driver door of the vehicle in a closed position or in an open position, said door position sensor comprising a door magnet and a vehicle reed switch;

a transmitter being electrically coupled to said door position sensor, said transmitter being actuated to send a closed signal when said vehicle reed switch detects said door magnet and said transmitter being actuated to send an open signal when said vehicle reed switch does not detect said door magnet;

a power source being electrically coupled to said door position sensor;

a seat position sensor being mounted to said safety seat, said seat position sensor being actuated when the driver attaches the car seat to the base of said safety seat or removes the car seat from the base of said safety seat, said seat position sensor comprising a safety seat reed switch and a seat magnet;

a transceiver being electrically coupled to said seat position sensor and being in wireless communication with said transmitter of said door position sensor;

a control circuit being electrically coupled to said transceiver, said control circuit being configured to send an alarm signal from said transceiver to a personal electronic device when said safety seat reed switch detects said seat magnet and said transceiver receives said open signal from said transmitter;

a power supply being electrically coupled to said control circuit, wherein said power supply is coupled to said base of said safety seat, said power supply being a rechargeable battery; and a power port being mounted on said base of said safety seat and being electrically coupled to said power supply, said power port being centered on a front of said base.

2. The child abandonment prevention system of claim 1, wherein said frame has an exterior surface and an interior surface, said frame having a plurality of openings extending through said exterior surface and said interior surface, each of said openings forming a perimeter surface between said exterior surface and said interior surface of said frame.

3. The child abandonment prevention system of claim 2, wherein one of said openings being positioned proximate to said driver seat to define a driver opening.

4. The child abandonment prevention system of claim 3, wherein each of said doors being pivotally coupled to said perimeter surface of one of said plurality of openings of said frame, wherein said driver door is pivotally coupled to said perimeter surface of said driver opening.

5. The child abandonment prevention system of claim 4, wherein each of said doors allows access through a selective one of said plurality of openings of said frame in said open position, each of said doors inhibiting access through said selective one of said plurality of openings of said frame in said closed position.

6. The child abandonment prevention system of claim 5, wherein said door magnet being mounted to said driver door, said vehicle reed switch being mounted to said frame of said vehicle, said vehicle reed switch detecting said door magnet when the driver door is positioned in said closed position, said vehicle reed switch does not detecting said door magnet when the driver door is positioned in said open position.

7. The child abandonment prevention system of claim 1, wherein said car seat being configured for holding the child, a bottom side of said car seat having a first mating member and a top side of said base having a second mating member, wherein said first mating member releasably couples to said second mating member, said safety seat being removably fastened to the back seat of the vehicle.

8. The child abandonment prevention system of claim 7, wherein said safety seat reed switch being mounted to said top surface of said base of said safety seat and said seat magnet being mounted to said bottom side of said car seat, said safety seat reed switch detects said seat magnet when said car seat is attached to said base, said safety seat reed switch not detecting said seat magnet when said car seat is removed from said base.

9. The child abandonment prevention system of claim 1, wherein said transmitter being electrically coupled to said vehicle reed switch.

10. The child abandonment prevention system of claim 1, wherein said power source being electrically coupled to said vehicle reed switch, said power source being coupled to the vehicle.

11. A child abandonment prevention system configured for alerting a driver of a child in a safety seat, said child abandonment prevention system comprising:

a vehicle, said vehicle including:
  a frame, said frame having an exterior surface and an interior surface, said frame having a plurality of openings extending through said exterior surface and said interior surface, each of said openings forming a perimeter surface between said exterior surface and said interior surface of said frame;
  a plurality of seats being positioned within said frame, said plurality of seats including a driver seat and a back seat, one of said openings being positioned proximate to said driver seat to define a driver opening; and
  a plurality of doors being coupled to said frame, said plurality of doors including a driver door being positioned proximate to said driver seat of said plurality of seats, each of said doors being pivotally coupled to said perimeter surface of one of said plurality of openings of said frame, wherein said driver door is pivotally coupled to said perimeter surface of said driver opening;

a car seat being removably attached to a base to define the safety seat, said car seat being configured for holding the child, a bottom side of said car seat having a first mating member and a top side of said base having a second mating member, wherein said first mating member releasably couples to said second mating member, said safety seat being removably fastened to the back seat of the vehicle;

a door position sensor being mounted to the vehicle, said door position sensor being actuated when the driver positions the driver door of the vehicle in a closed position or in an open position, each of said doors allowing access through a selective one of said plurality of openings of said frame in said open position, each of said doors inhibiting access through said selective one of said plurality of openings of said frame in said closed position, said door position sensor comprising a door magnet and a vehicle reed switch, said door magnet being mounted to said driver door, said vehicle reed switch being mounted to said frame of said vehicle, said vehicle reed switch detecting said door magnet when the driver door is positioned in said closed position, said vehicle reed switch not detecting said door magnet when the driver door is positioned in said open position;

a transmitter being electrically coupled to said door position sensor, said transmitter being electrically coupled to said vehicle reed switch, said transmitter being actuated to send a closed signal when said vehicle reed switch detects said door magnet and said transmitter being actuated to send an open signal when said vehicle reed switch does not detect said door magnet;

a power source being electrically coupled to said door position sensor, said power source being electrically coupled to said vehicle reed switch, said power source being coupled to the vehicle;

a seat position sensor being mounted to said safety seat, said seat position sensor being actuated when the driver attaches the car seat to the base of said safety seat or removes the car seat from the base of said safety seat, said seat position sensor comprising a safety seat reed switch and a seat magnet, said safety seat reed switch being mounted to said top surface of said base of said safety seat and said seat magnet being mounted to said bottom side of said car seat, said safety seat reed switch detects said seat magnet when said car seat is attached to said base, said safety seat reed switch not detecting said seat magnet when said car seat is removed from said base;

a transceiver being electrically coupled to said seat position sensor and being in wireless communication with said transmitter of said door position sensor;

a control circuit being electrically coupled to said transceiver, said control circuit being configured to send an alarm signal from said transceiver to a personal electronic device when said safety seat reed switch detects said seat magnet and said transceiver receives said open signal from said transmitter;

a power supply being electrically coupled to said control circuit, said power supply being coupled to said base of said safety seat, said power supply being a rechargeable battery; and a power port being mounted on said base of said safety seat and being electrically coupled to said power supply, said power port being centered on a front of said base.

* * * * *